INVENTOR.
WILLIAM S. APPLEMAN
BY DONAL W. CHANEY

Schmieding & Fultz
ATTORNEYS

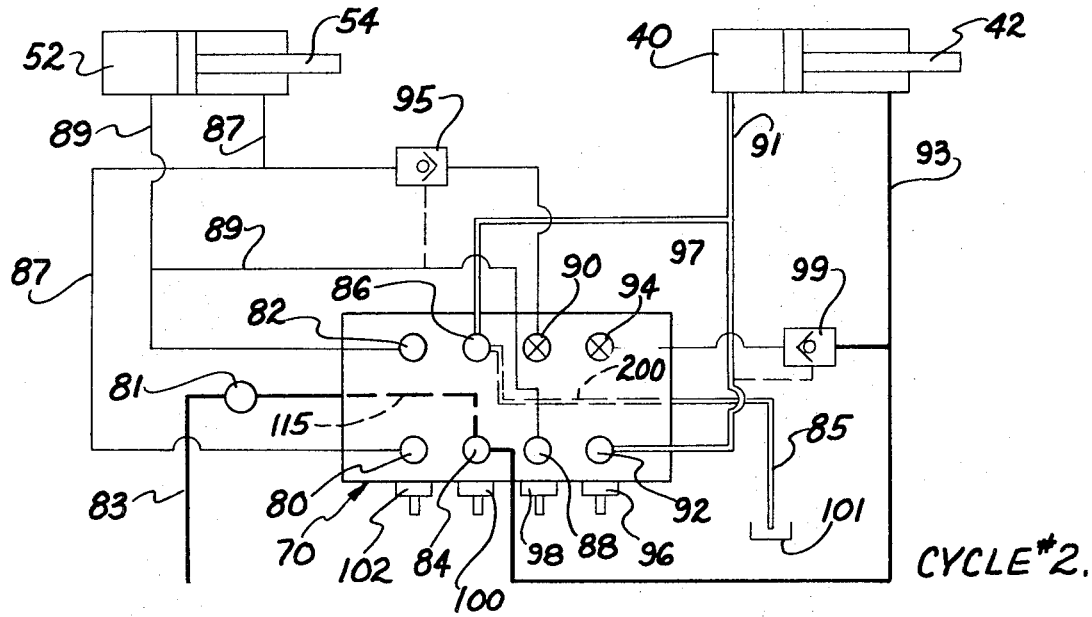
Fig. 14. CYCLE #2.
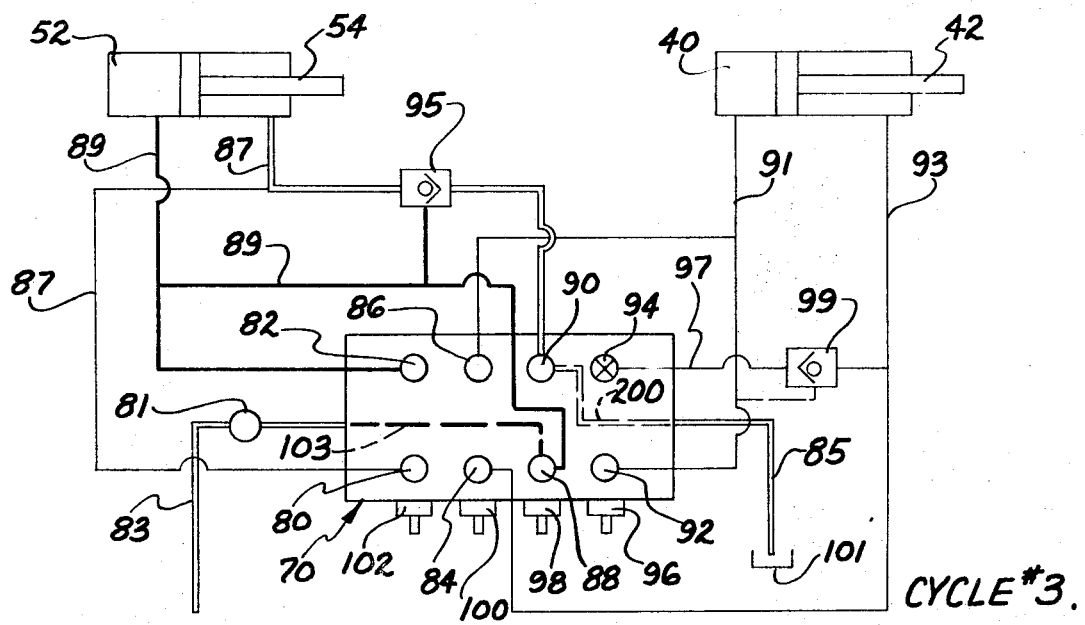
Fig. 15. CYCLE #3.

CYCLE #4.

INVENTOR.
WILLIAM S. APPLEMAN
BY DONAL W. CHANEY

Schmieding & Fults
ATTORNEYS

United States Patent Office 3,615,028
Patented Oct. 26, 1971

3,615,028
REFUSE HANDLING APPARATUS
William S. Appleman and Donal W. Chaney, Galion,
Ohio, assignors to Harsco Corporation, Harrisburg, Pa.
Filed Feb. 19, 1969, Ser. No. 800,619
Int. Cl. B65f 3/00
U.S. Cl. 214—83.3                                    5 Claims

ABSTRACT OF THE DISCLOSURE

A refuse truck of the rear loading type provided with a novel packer blade and associated control apparatus. More specifically, the packer blade is mounted on a carriage that is arranged to reciprocate on an inclined track means so as to load and pack the truck body and the blade and carriage are respectively actuated by separate hydraulic cylinders which are in turn controlled in a novel manner so as to operate the carriage and the blade through successive cycles each of which is controlled by a respective pressure responsive controller. As a result, each of said cycles is automatically terminated by the occurrence of a predetermined pressure value and the mechanism will automatically proceed to the next succeeding cycle.

---

This invention relates to refuse handling equipment and more particularly to rear load type refuse trucks provided with a novel packing apparatus.

In general the refuse truck of the present invention includes a body comprising a forward refuse receiving body portion and a rear body portion communicating with said forward body portion and provided with a novel packer blade and associated control apparatus.

In accordance with the present invention the packer blade is pivotally mounted on a carriage that is arranged to reciprocate on an inclined track means so as to load and pack the forward body portion and the blade and carriage are respectively actuated by separate hydraulic cylinders which are in turn controlled in a novel manner so as to operate the carriage and the blade through successive cycles each of which is controlled by a respective pressure responsive controller. As a result, each of said cycles is automatically terminated by the occurrence of a predetermined pressure value, and the mechanism will automatically proceed to the next succeeding cycle.

As one aspect of the present invention, the above mentioned plurality of pressure responsive controllers, that respectively control the plurality of cycles, are each arranged to be pre-set by a common manual actuator, so as to be subsequently pressure triggered sequentially by predetermined system pressure values. Moreover, the plurality of pressure responsive controllers can also be manually uncocked by said common manual controller thereby terminating operation of the packer blade mechanism and its carriage at any position in their paths of movement.

As another aspect of the present invention, after the packer blade mechanism has been stopped at some position as described above, the common manual actuator can be used to re-set the plurality of pressure actuated controllers which will then restart operation of the packer blade mechanism and said controllers will function to cause the packer blade to automatically return to and complete certain of said cycles in predetermined priority and sequence.

As still another aspect of the present invention, when the packer blade is being moved through one of the above mentioned cycles, wherein it is caused to first engage the refuse, and in the event it engages a foreign object that becomes jammed between said blade and the bottom wall of the loading opening, then in that event the respective pressure responsive controller for such cycle will automatically arrest the blade actuating cylinder responsive to a predetermined system pressure value thereby releasing the fluid pressure on the packing blade. At the same time, the next successive or blade retraction cycle will automatically be negotiated whereby the packing blade is dragged freely past said foreign object.

As another aspect of the present invention, in addition to the above described automatic cycling operation the novel control system is also adapted for what may be termed jog type operation whereby the operator can individually actuate a manual control lever that energized only the hydraulic cylinder for reciprocating the carriage in its track, or a second manual control lever that energizes only the hydraulic cylinder for pivoting the packing blade. Moreover, the operator can actuate these levers to accomplish either short or long paths of movement of the carriage or blade as may be desired. As an advantageous result the operator has the ability to stop the machine during automatic cycling and then use such jog type control to move the packing blade away from a clogging object, or perhaps stop the packing blade and move it away from an object that he does not desire to pack.

As another aspect of the present invention the present novel control system has a decided advantage in that it is adapted to proceed from an interrupted cycle of movement to the next successive cycle of the packing blade without the necessity of reversing the mechanism back to its prior path of movement. As a result the movement of the mechanism and force being applied by the packing blade to the load can be terminated and the carriage can be moved to drag the deenergized packing blade past the refuse.

As still another aspect of the present invention, the novel control system is so arranged that if movement of the packing blade is manually stopped during a refuse engaging cycle, and then restarted by the operator, the packing blade will always raise away from engagement with an obstructing object, let such object reposition itself, after which the blade will automatically take a new pressurized engagement with such repositioned object.

It is still another aspect of the present invention to provide a novel control apparatus of relatively simple design requiring only a minimum of adjustments. More specifically, the only adjustment required is the setting of a single pressure setting screw in each of a plurality of pressure responsive controllers so as to preselect the above described predetermined pressure at which each controller is actuated.

As still another aspect of the present invention, the novel control system, being pressure responsive, eliminates the need for limit switches and mechanical linkages to actuate control valves. Such elements have been sources of mechanical trouble in prior devices in that they have the tendency to become worn and distorted whereby the accuracy of control is lost.

It is, therefore, an object of the present invention to provide a refuse truck provided with a packer blade and novel associated control mechanism adapted to automatically move said blade through successive pressure controlled cycles.

It is another object of the present invention to provide an apparatus of the type described wherein said control mechanism is further adapted to stop said blade at any position, and subsequently re-start movement of said blade so as to cause the blade to return to and complete certain of its cycles in predetermined priority and sequence.

It is still another object of the present invention to provide an apparatus of the type described wherein a fluid actuated packing blade is automatically arrested at a predetermined systems pressure, in the event it engages a foreign object that obstructs its path of movement.

It is still another object of the present invention to provide an apparatus of the type described which is adapted to automatically proceed through subsequent cycles after the packing blade has become arrested by striking a foreign object during a refuse engaging cycle.

It is another object of the present invention to provide an apparatus of the types described whereby the operator cannot only operate the machine through automatic cycling but also can selectively use a jog type operation during which individual manual controllers can be used to selectively either pivot the packing blade or extend or retract the carriage on which such blade is mounted. Moreover, this can be done through either short or long paths of movement, in either direction, as may be required to disengage or prevent the packing of foreign objects in the refuse.

It is another object of the present invention to provide an apparatus of the type described wherein the packing blade will, when stopped and restarted, automatically raise off the refuse and then again proceed to move into force transmitting engagement therewith.

It is another object of the present invention to provide an apparatus of the type described wherein the packing blade can be stopped during a refuse engaging cycle and the next succeeding cycle in the path of movement can be negotiated without the necessity of reversing the path of movement of the apparatus.

It is another object of the present invention to provide an apparatus of the type described that is of simple construction requiring only a minimum of adjustments to prepare the machine for operational use.

It is still another object of the present invention to provide an apparatus of the type described that eliminates the need for mechanically actuated limit switches as well as mechanical linkages for automatically actuating valve elements.

Further objects and advantages of the present invention will be apparent from the following description, reference being had to the accompanying drawings wherein a preferred form of embodiment of the invention is clearly shown.

Figure 9:
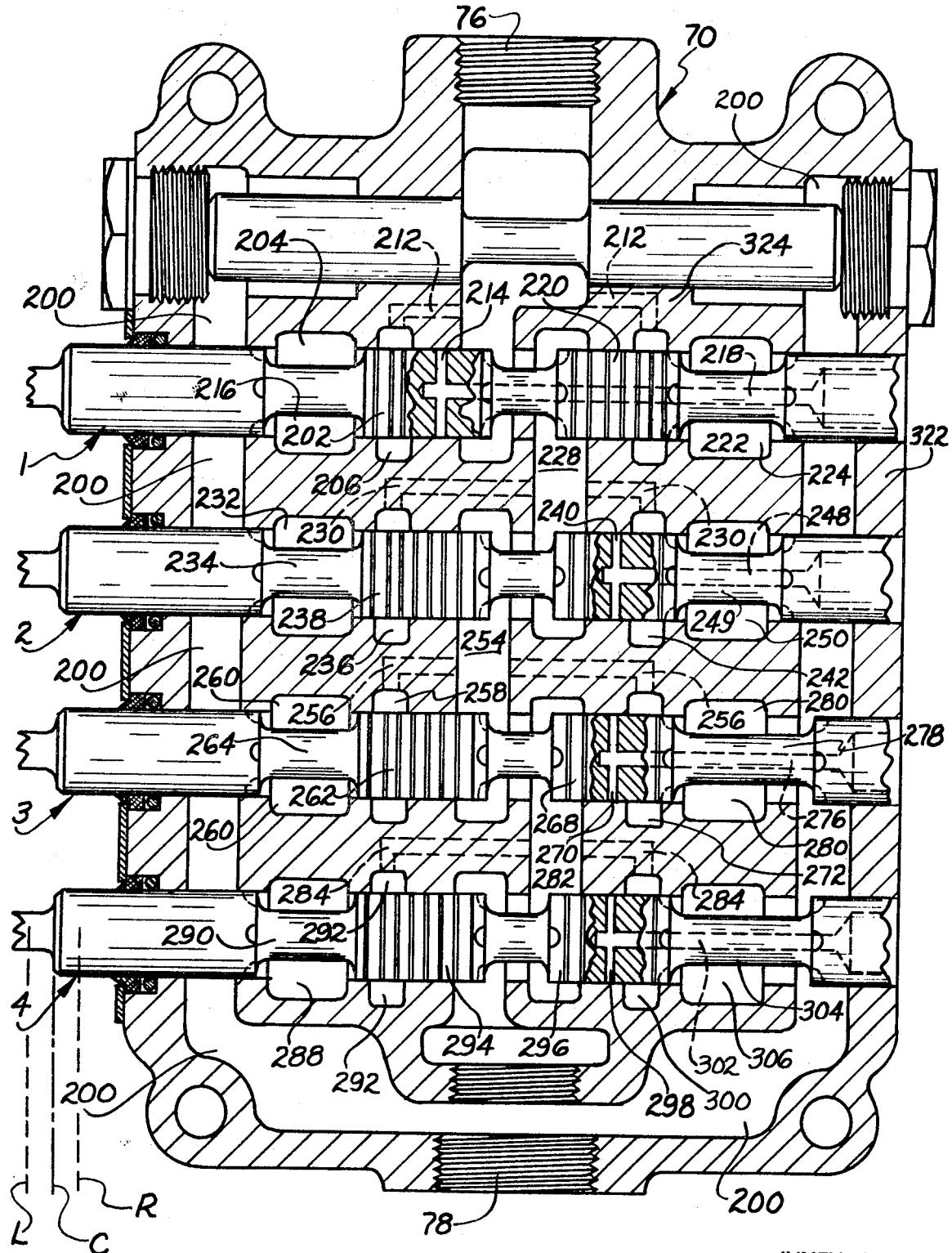
FIG. 9 is a partial top sectional view of the control means of the preceding figures, the section being taken along a horizontal plane through such control means.
Figure 10:
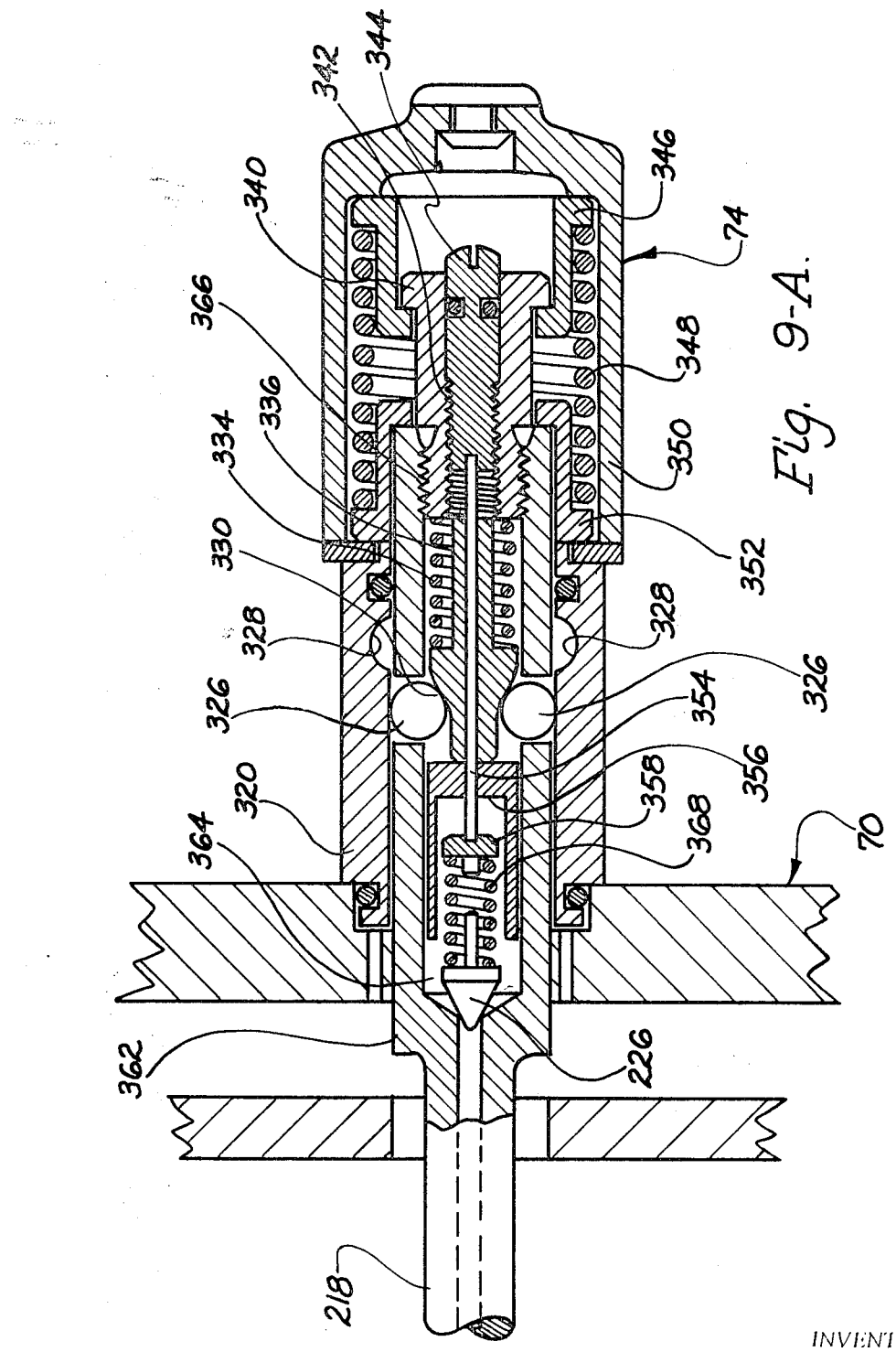
Figure 11:
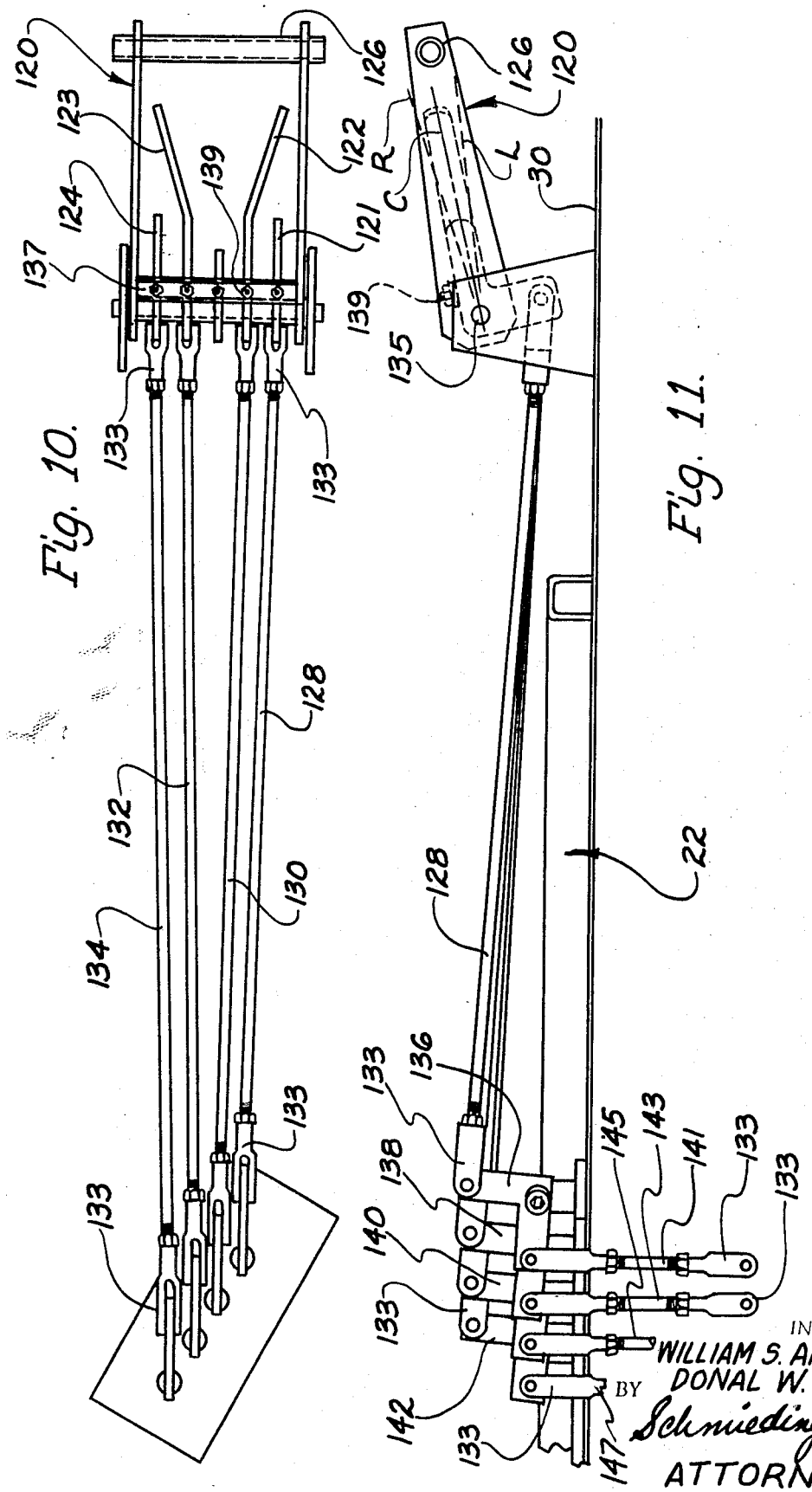

FIG. 9-A is a sectional view showing the interior of a pressure responsive controller comprising a portion of the control means of the preceding figures, the section being taken along a plane through the centerline of such controller;

FIG. 10 is a side elevational view of a manual actuator mechanism comprising a portion of the apparatus of the present invention;

FIG. 11 is a side elevational view of the mechanism of FIG. 10; and

FIGS. 12 through 16 are diagrammatic views illustrating various flow cycles through a hydraulic circuit comprising a portion of the apparatus of the present invention.

Figure 1:
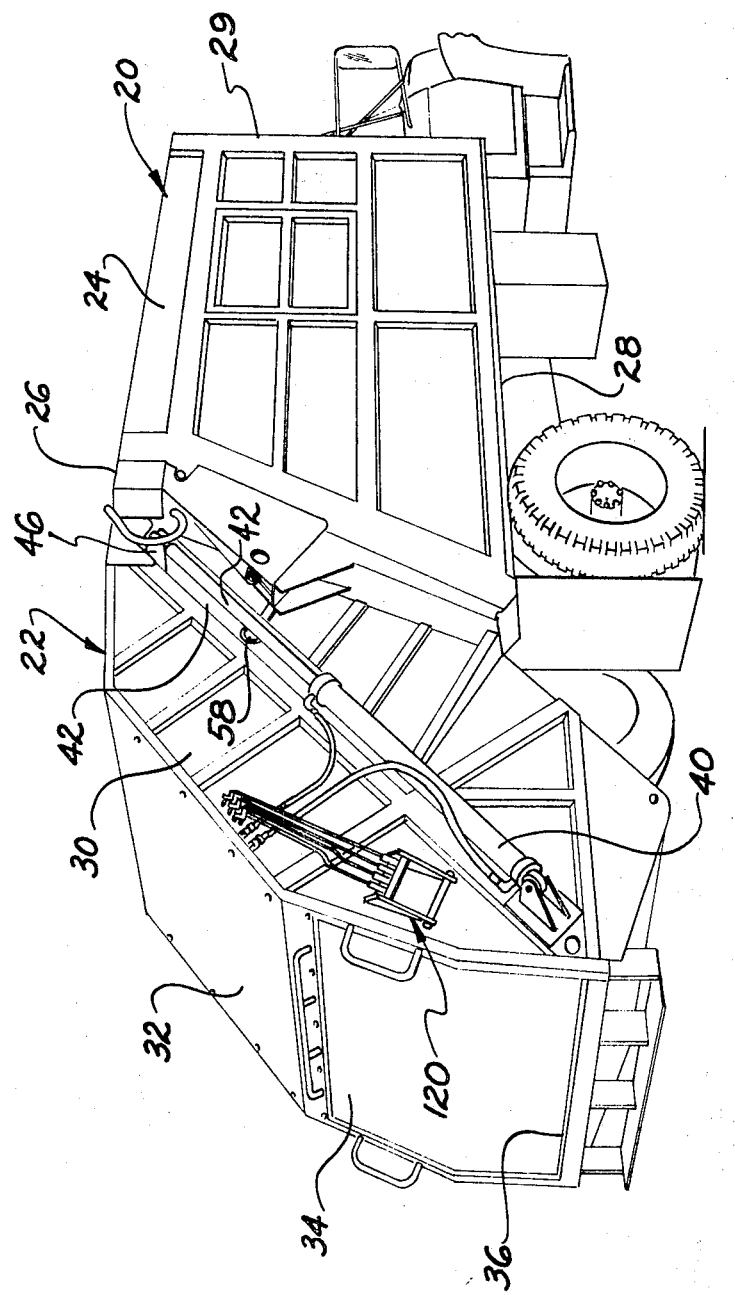
FIG. 1 is a partial rear perspective view illustrating a rear loader type refuse truck to which the apparatus of the present invention has been applied.
Figure 2:
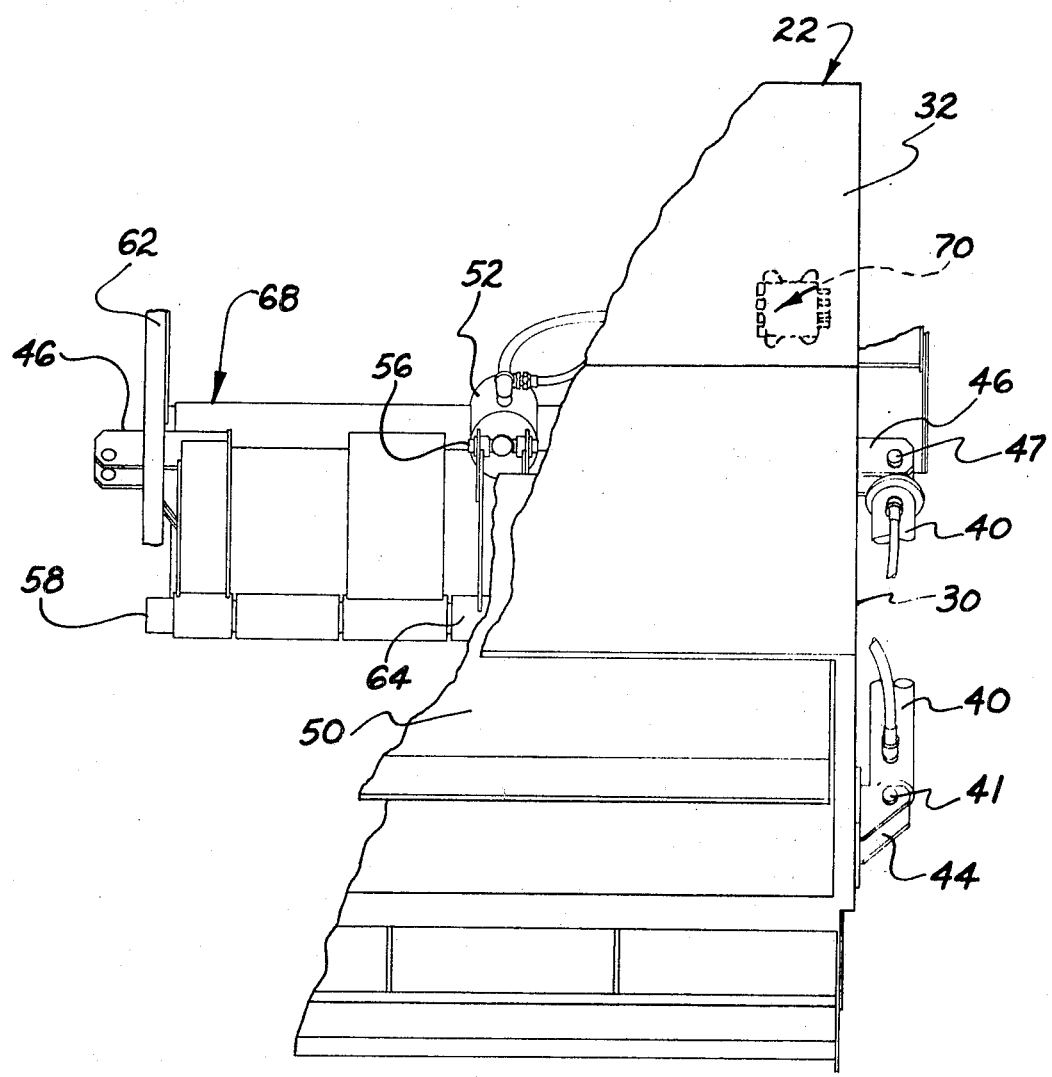
FIG. 2 is a partial rear view, in broken section, showing the packer blade and carriage apparatus comprising a portion of the present invention.
Figure 3:
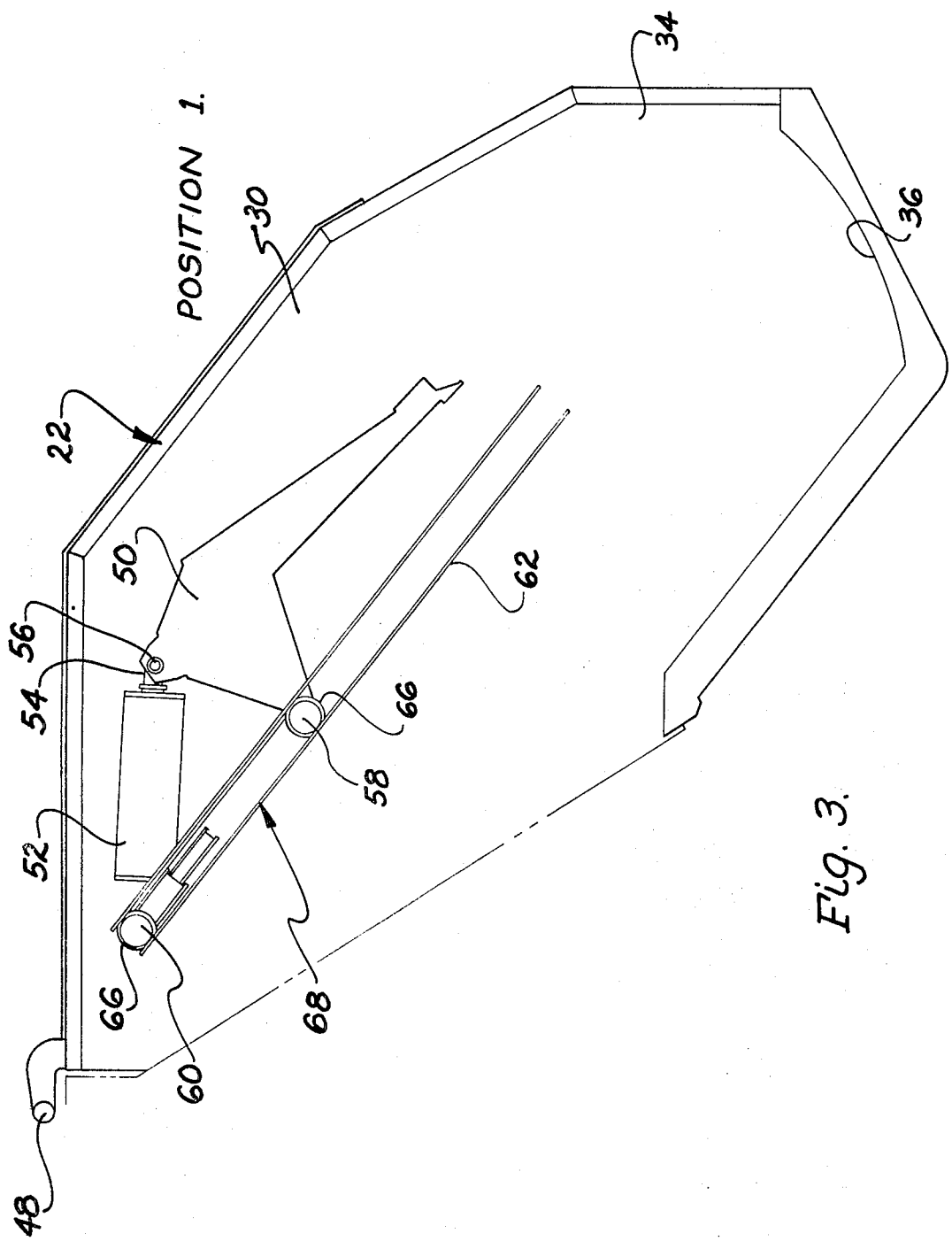
FIGS. 3 through 6 are side sectional views of a rear body portion and apparatus of FIG. 2, the section being taken along a vertical plane through the centerline of such body portion.

Referring in detail to the drawings, FIGS. 1 and 2 illustrate a rear loader type refuse truck that includes a forward refuse receiving body portion indicated generally at 20 and a rear packer body portion indicated generally at 22. Rear body portion 22 is pivotally attached to the forward body portion 20 at a pivot 48, FIG. 4, and a hydraulic cylinder 21 is operatively connected between the forward and rear body portions at the pivots 23 and 25. Rear body portion 22 can be pivoted upwardly and away from front body portion 20 by extension of hydraulic cylinder 21 thereby permitting unloading of front body portion 20 after it has been packed with refuse.

With continued reference to FIG. 1, forward body portion 20 includes side walls 24, a top wall 26, a bottom wall 28 and a front wall 29 which define a refuse receptacle into which the packing apparatus on the rear body portion 22 functions to load and pack refuse.

Referring next to FIGS. 2–6, rear body portion 22 includes a carriage indicated generally at 68 which is mounted for reciprocation on inclined tracks 62 supported by side walls 30 of rear body portion 22.

Carriage 68 includes an upper shaft 60, the ends of which are provided with rollers 66 that run in track 62 and a lower shaft 58, the ends of which are provided with similar rollers 66 which also are mounted in the track.

Carriage 68 further includes outwardly extending brackets 46 which are pivotally attached to a pair of carriage actuating hydraulic cylinders 40 at the pivot pins 47. The lower end of hydraulic cylinders 40 are similarly pivotally attached to the side wall 30 of the rear body portion by the pivot pins 41 in brackets 44. It will now be understood that when carriage actuating cylinders 40 are pressurized in their upper chambers then cylinder rods 42 and carriage 68 are retracted downwardly and, conversely, when the other ends of the cylinders 40 are pressurized the cylinder rods and carriage will be extended upwardly.

With reference to FIGS. 2 through 6, a packing blade 50 includes collars 64 which are pivotally mounted on shaft 58 and a blade actuating cylinder 52 includes an inner end pivotally mounted on carriage 68 at upper shaft 60 and an extendable ram 54, the outer end of which is pivotally connected to packer blade 50 at a pivotal connection 56. It will now be understood that when blade actuating cylinder 52 is pressurized so as to extend ram 54 the packing blade will be pivoted about lower shaft 58 from Position 2 to Position 3. Conversely when the other side of cylinder 52 is pressurized, so as to withdraw ram 54, the packer blade 50 will be raised from Position 3 to Position 2.

It should be mentioned that the operators load refuse into the rear body portion 22 via a rear opening 34 such that the refuse is disposed on a bottom wall 36.

In general, when packing blade 50, just described, moves from Position 2 to Position 3 blade 50 will engage the refuse and, during a subsequent cycle, later to be described, when carriage actuating cylinder 40 is extended to raise carriage 68 from Position 3 to Position 4 then the refuse is further moved up into the previously described receptacle formed by forward body portion 20. As the forward body portion becomes filled the carriage actuating cylinders 40 serve to compress and pack the load.

Reference is next made to the novel control means of the present invention illustrated in FIGS. 7 through 16 which, in general, functions to automatically cycle the above mentioned carriage 68 and packing blade 50 through four pressure responsive cycles, when automatic actuation of the packer blade is desired. It should further be stated the control system is further adapted to permit selective independent "jog" actuation of either the packer blade alone or the carriage alone by the selective actuation of individual manual control levers which can be utilized by the operator when desired as will later be described in detail.

For purposes of describing operation of the packer blade, carriage, and control means it should generally be mentioned that the mechanism is programmed to automatically successively proceed through the following cycles and corresponding carriage and blade positions as follows:

Neutral—Position 4 (FIG. 6)
Cycle 1—Packer blade 50 moves from Position 4 to Position 1
Cycle 2—Carriage 68 moves from Position 1 to Position 2
Cycle 3—Packer blade 50 moves from Position 2 to Position 3
Cycle 4—Carriage 68 moves from Position 3 to Position 4

Figure 12:
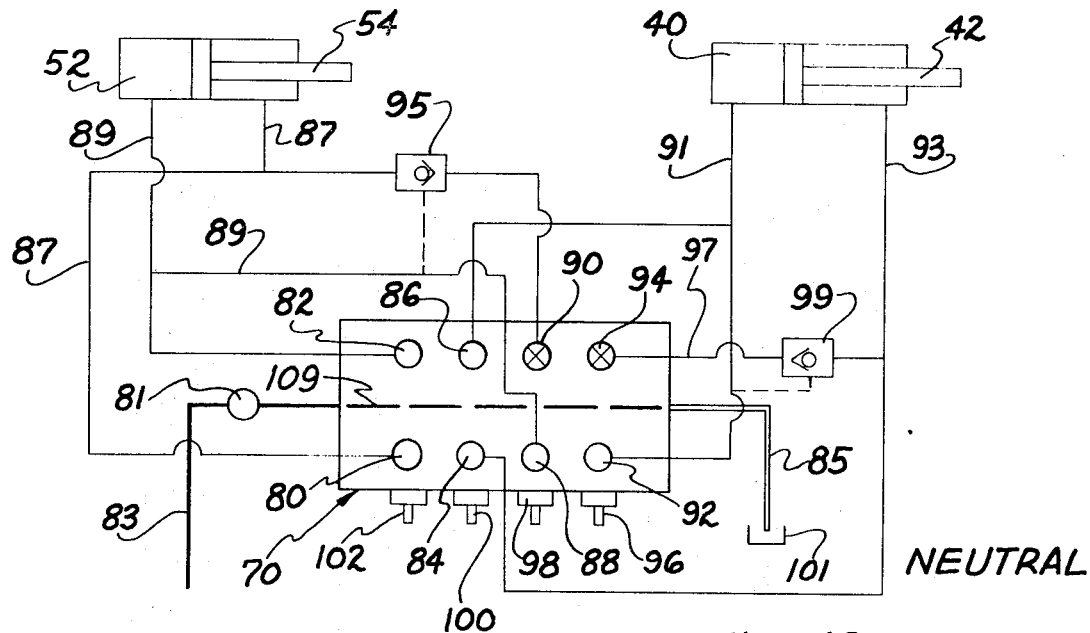

It should further be generally mentioned that FIG. 12 illustrates the hydraulic circuit for the control system when the mechanism is in Neutral.

Figure 13:
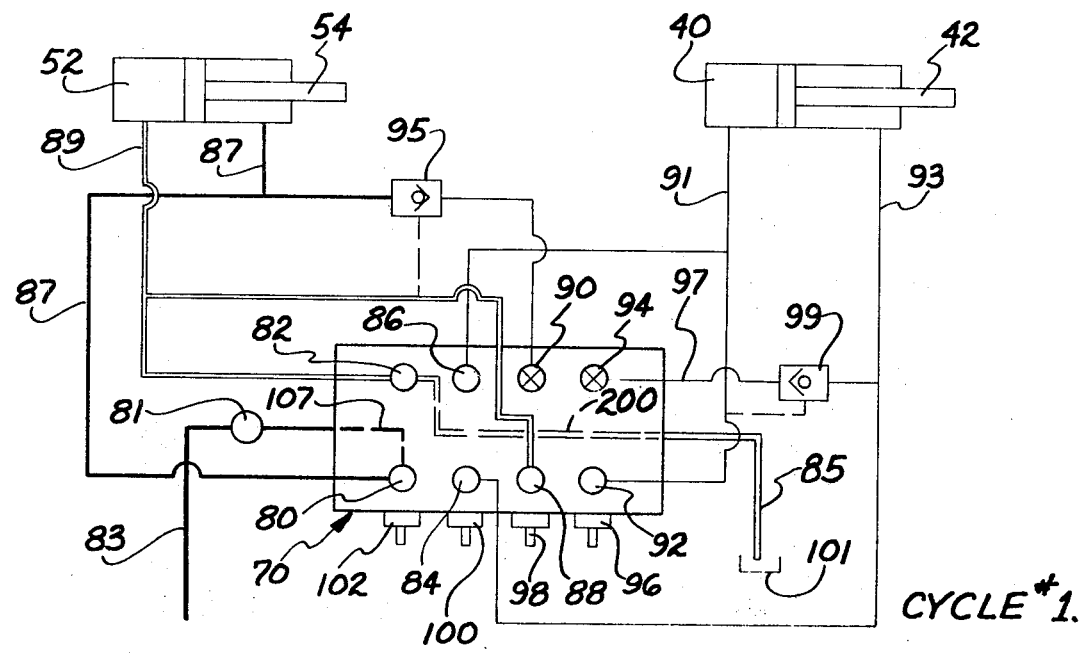

FIG. 13 illustrates the hydraulic circuit for the control system during cycle 1.

FIG. 14 illustrates the hydraulic circuit for the control system during cycle 2.

FIG. 15 illustrates the hydraulic circuit for the control system during cycle 3.

Figure 16:
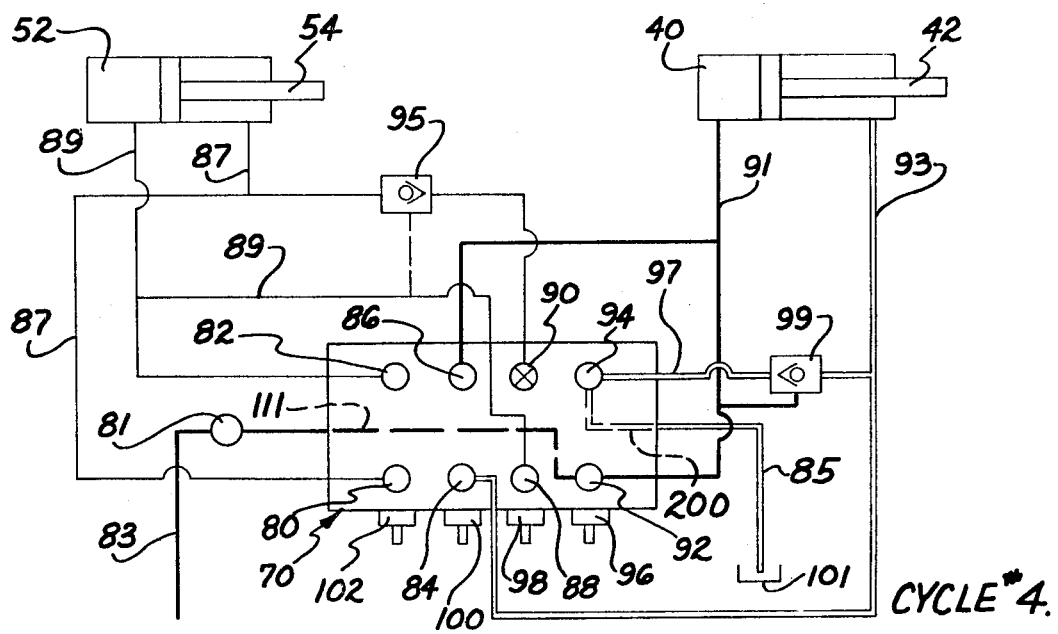

FIG. 16 illustrates the hydraulic circuit for the control system during cycle 4.

Figure 7:
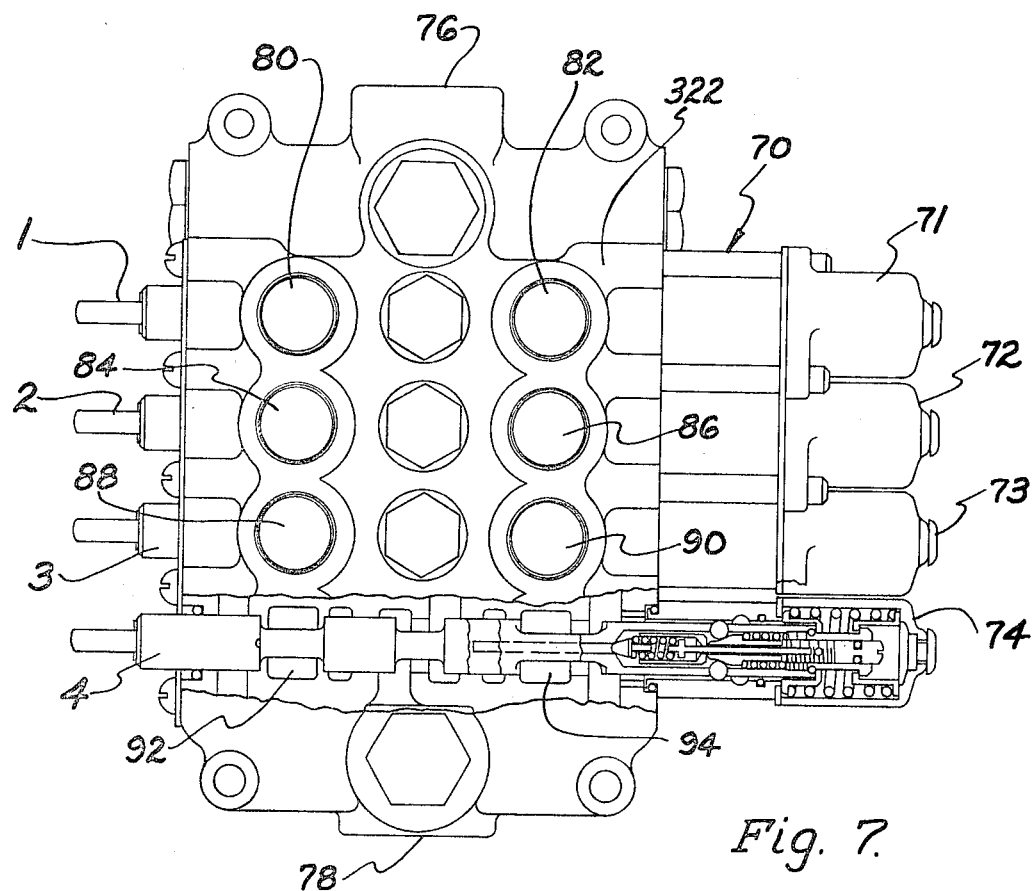
FIG. 7 is a top elevational view, partially in section, of a pressure responsive control means comprising a portion of the apparatus of the present invention, the section being taken along a horizontal plane through the centerline of such control means.
Figure 8:
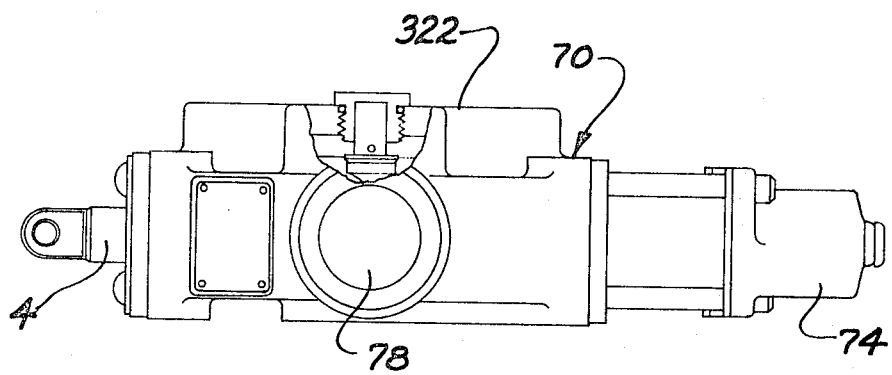
FIG. 8 is an end sectional view of the pressure responsive control means of FIG. 7.

Reference is next made to FIGS. 2, 7, and 8 which illustrate a pressure responsive control means indicated generally at 70. Such control means 70 is mounted on the frame of rear body portion beneath the cover 32, and is actuated by a manual control mechanism 120 mounted on right sidewall 30 of rear body portion 22, said mechanism being shown in enlarged detail in FIGS. 10 and 11.

As seen in FIG. 10 and FIG. 11 a master manual actuator is indicated generally at 120 and includes a handle portion 126 that is pivotally mounted to the rear body portion on a pivot rod 135. Handle 126 includes a common bar 137 provided with four adjusting screws 139 each of which engages a lower arm of a respective bell crank lever 121 through 124. When master actuator handle 126 is pushed inwardly towards the body, FIG. 11 the inner ends of adjusting screws 139 depress the lower arms of bell crank levers 121 through 124 causing them to pivot about pivot shaft 135 and thereby extend push rods 128, 130, 132, and 134 upwardly. Such upward movement of the push rods actuate the respective upper bell crank levers 136–142 which move four horizontal actuating rods 141, 143, 145, and 147 inwardly towards the rear body portion. Each of these rods includes a pivotal connection with a respective one of the spools 1–4 of the control means 70 of FIGS. 7 through 9–A. Hence, it will be understood that when master manual controller 120 is pushed inwardly, for automatic operation, all four spools 1–4 are shifted from a centered position to a right position as viewed in FIG. 9 and when such master controller is pulled out spools 1–4 return to the centered position of FIG. 9.

At this time it should be mentioned that two of the lower bell crank levers 122 and 123, FIGS. 10 and 11, have extended lower arms which form individual manual actuators for each of the two center spools 2 and 3 of the control means 70 of FIGS. 7 through 9–A. Lever 122 can be individually actuated to perform a manual jog operation of carriage 48 and that when this lever is pushed inwardly towards the rear body portion spool 2 is actuated from a centered position to the right, FIG. 9, and when individual lever 122 is pulled outwardly from the rear body portion then such spool 2 is actuated outwardly to the left.

Similarly when the other lever 123 is pushed inwardly then only spool 3 is shifted from a centered position to the right, FIG. 9, and when such individual actuator 123 is pulled outwardly then spool 3 is shifted from the centered position to the left.

The jog type operation which results from such individual actuation of spools 2 and 3 will be explained in detail later herein.

Reference is next made to FIGS. 7 through 9–A which illustrate a pressure responsive control means indicated generally at 70 which includes an outer housing portion 322 and an inner housing portion 324 separated by a drain passage 200 that communicates with an outlet passage 78 leading back to reservoir 101, FIGS. 12–16. As previously mentioned the four spools 1 through 4 can be shifted from the centered positions illustrated to right or actuated positions by master manual actuator handle 126 just described.

As seen in FIG. 7, four separate pressure responsive controllers are indicated generally at 71 through 74, one for each of the spools 1–4. The interior of one of such controllers 71–74 is illustrated in enlarged detail in FIG. 9–A and the operation of this device will be described in detail later herein.

AUTOMATIC OPERATION OF THE CONTROL SYSTEM

Neutral

As seen in the flow diagrams of FIGS. 12–16 a pump 81 driven by the vehicle engine provides pressurized fluid for the system. When the previously described master actuator handle 126 is in its neutral position all of the spools 1–4 are centered, FIG. 9, whereby the central grooves in the spools form an open passage through control means 70 as is indicated schematically in dotted delineation at 109 in FIG. 12. Such schematically represented passage 109 is formed by the individual passages in valve body 324 as seen in detail in FIG. 9 at 76, 228, 254, 282, and 78.

Cycle 1

When the master actuator handle 126, FIGS. 10 and 11, is pressed inwardly towards the body all four spools 1–4 are shifted from centered positions C to right or actuated positions R as seen in FIG. 9 wherein the spools are releasably retained in such actuated positions by the pressure responsive controllers 71–74. As seen in FIG. 9–A, the spools are thus retained since sleeve portions 320 on the right ends of the spools shift the balls 326 into respective detents 328 formed in the controller housings 320.

Figure 4:
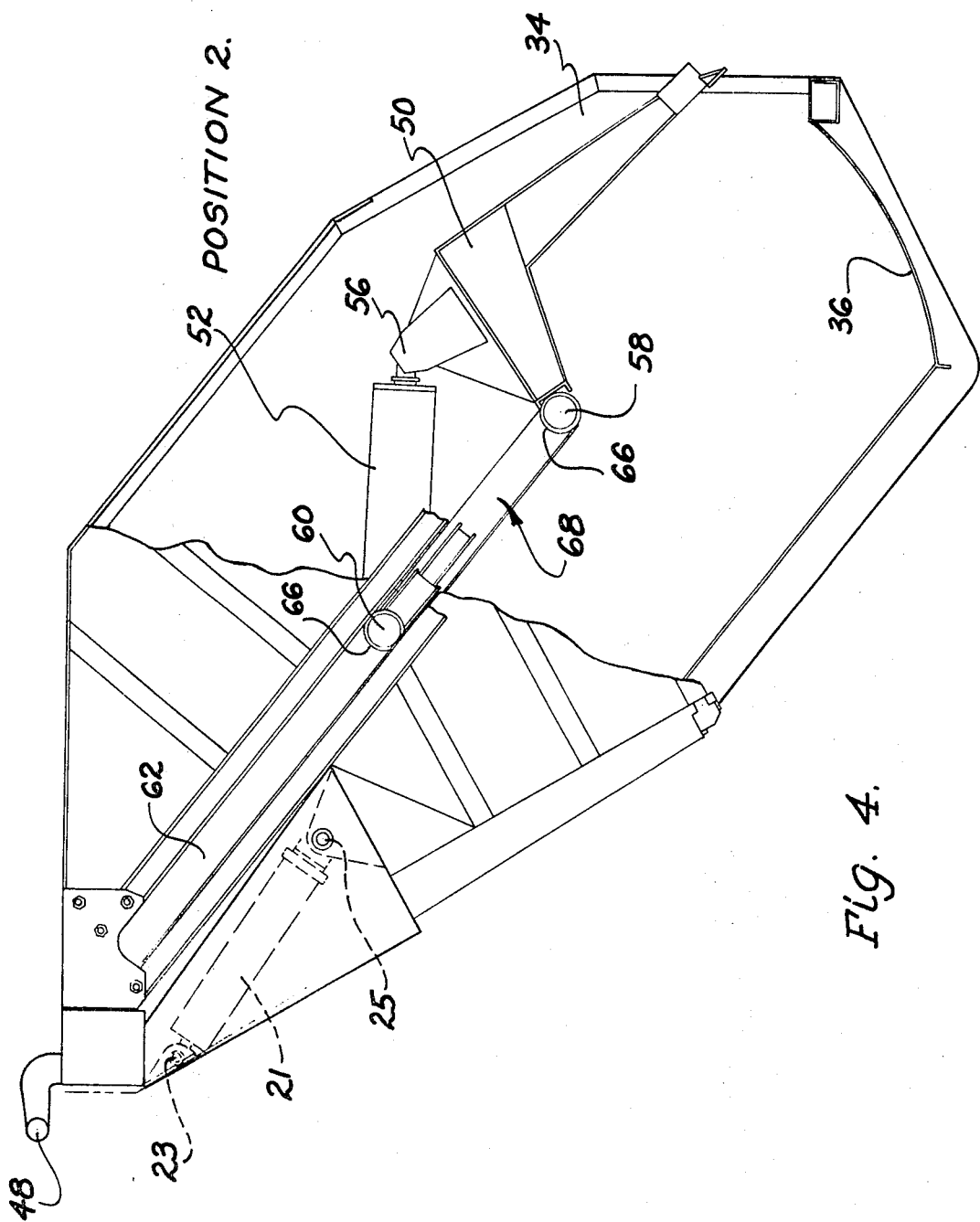

During cycle 1 packer blade 50 is moved from the position of FIG. 4 to the position of FIG. 1 and only the blade actuating cylinder 52 is pressurized in a direction to retract the ram 54 of such cylinder.

As seen in FIG. 9, with all four spools retained in actuated positions R spool 1 is first in line to receive the pressurized flow from inlet 76 and the flow will be released through a first pressurized outlet port 80, FIGS. 7 and 13, and then via line 87 to the retraction chamber of blade actuating cylinder 52. As seen in FIG. 9 the above described circuit connection is made within control means 70 via passage 76, passage 212, and recess 216 in spool 1 which connects annular housing recesses 204 and 206 when spool 1 is shifted to the right position. It should be mentioned that the left housing recess 204 communicates with the previously mentioned outlet port 80 which in turn communicates with the retraction chamber of blade actuating cylinder 52.

With continued reference to FIG. 9 when spool 1 is in its right position housing recess 224 is connected to drain passage 200 via spool recess 222. This serves to connect port 82 in the control means housing, FIG. 7 with line 89 in the circuit of FIG. 13 that drains the extension chamber of blade actuating cylinder 52 to tank 101 via line 89, drain passage 200 through the valve housing, and line 85 back to tank 101.

As seen in FIGS. 9 and 9–A, with spool 1 shifted to the right, in its actuated position, an axial detector passage 218 and radial detector passage 214 receive pressurized oil from housing passage 76 and thereby transmit system pressure to a poppet 226 of pressure responsive controller 71. When the pressure reaches some predetermined value, for example 1300 p.s.i. poppet 226 is unseated thereby shifting a cam surface 330 to the right, FIG. 9-A, whereby a compressed main spring 348 drives spool 1 back to its centered open position thereby opening passage 228 leading to spool 2. It should be pointed out that main spring 348 is operatively compressed between a right spring seat 346 and a left spring seat 352, the latter being in engagement with the right end of spool sleeve 362 as seen in FIG. 9-A.

It should be mentioned that the predetermined pressure referred to above is established by pressure seting screw 344 which is axially movable in a threaded bore 342 in annular member 340 which is in turn mounted in the spool sleeve 362 at a threaded junction 366. Manipulation of pressure setting screw 344 varies the bias on a compression spring 368 interposed between poppet 226 and a rod extension 354 carried by pressure setting screw 344. The inner end of such rod extension 354 includes a fixed spring retainer member 358 and the rod also extends through a guide and spring housing member 356. When pressure setting screw 344 is actuated, spring 368 is compressed or decompressed to provide the necessary preloaded force on poppet 226 to provide the previously mentioned predetermined pressure at which the spool is returned from ts right to its centered position.

Cycle 2

The function of cycle 2 is to move carriage 48 from Position 1 to Position 2 by pressurizing only the retraction chamber of carriage actuating cylinder 40.

The circuit flow for cycle 2 is illustrated in FIG. 14 and the internal operation of control means 70 is shown in FIG. 9.

Referring to FIG. 9, after spool 1 has been reset to its centered position, at the predetermined pressure value arrived at at the end of cycle 1 when the blade actuating cylinder ram is fully retracted, spool 2, still being in its set position to the right, is the next spool to receive pressurized fluid via passages 76 and 228.

Since spool 2 is shifted to the right a second outlet port 84 in the control means housing, FIG. 7, is pressurized via housing chamber 228, passage 230, and annular housing grooves 232 and 236, the latter being connected via spool recess 234.

At the same time a right spool recess 249 connects a second drain port 86 in the control means housing, FIG. 7, with tank via annular housing groove 250 drain passage 200, and outlet port 76 connected to reservoir line 85.

As seen in FIG. 14 in such cycle 2 position pressurized port 84 is connected to the retraction side of carriage actuating cylinder 40 via line 93 and the other side of the carriage actuating cylinder is drained to low pressure port 86 via line 91. This causes rams 42 of the carriage actuating cylinder to retract to the end of its stroke at which time the system pressure builds up to a predetermined pressure value established by the setting of pressure setting screw 344 of pressure responsive controller 72. Such controller then shifts spool 2 back to its neutral open centered position in the manner previously described thereby terminating cycle 2.

Cycle 3

During this cycle packer blade 50 is moved from its raised Position 2 to its lowered Position 3.

With spool 2 reset in its neutral open centered position spool 3 is in turn subjected to pressure via passage 254, and is disposed in its set position. Hence the third pressurized port 88, FIG. 7, is pressurized via housing port 254, passage 256, and annular housing grooves 258 and 260, the latter being connected by spool recess 264. At the same time housing port 90 and right housing groove 280 are connected to tank passage 200 via spool recess 278.

With spool 3 shifted to the right and making the connections just described the flow diagram of cycle 3 is set up as seen in FIG. 15 wherein the third pressurized port 88 delivers pressurized oil to the extension side of blade actuating cylinder 52 via a line 89 and the other side of such cylinder is drained to tank via line 87, drain port 90, drain passage 200 in controllers body, and line 85 to tank 101.

It should be mentioned that line 87, FIG. 15, is provided with a pilot operated check valve 95 which is opened by the pressurization of line 89 thereby permitting the drain of the ram side of the blade actuating cylinder 52.

Figure 5:
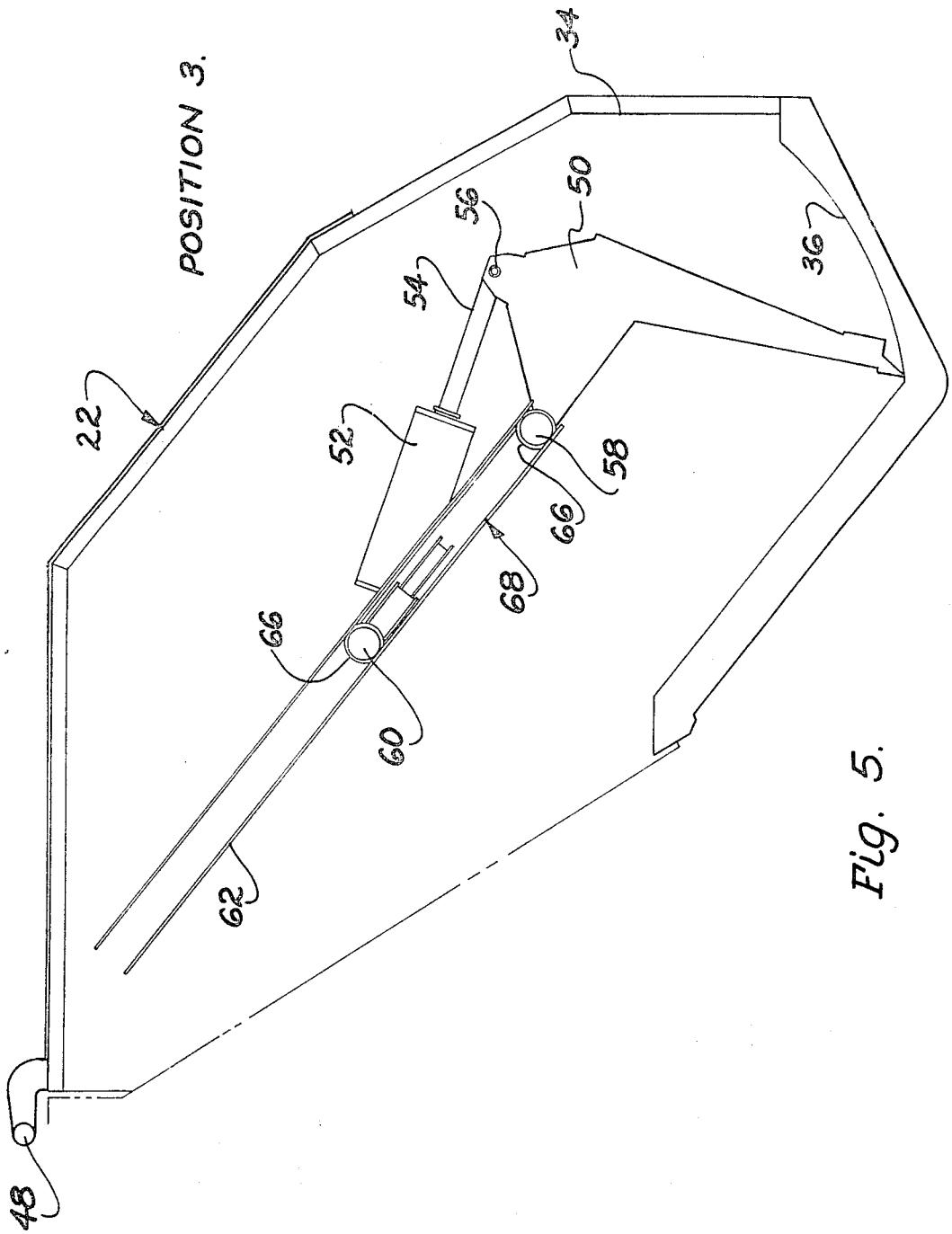
Figure 6:
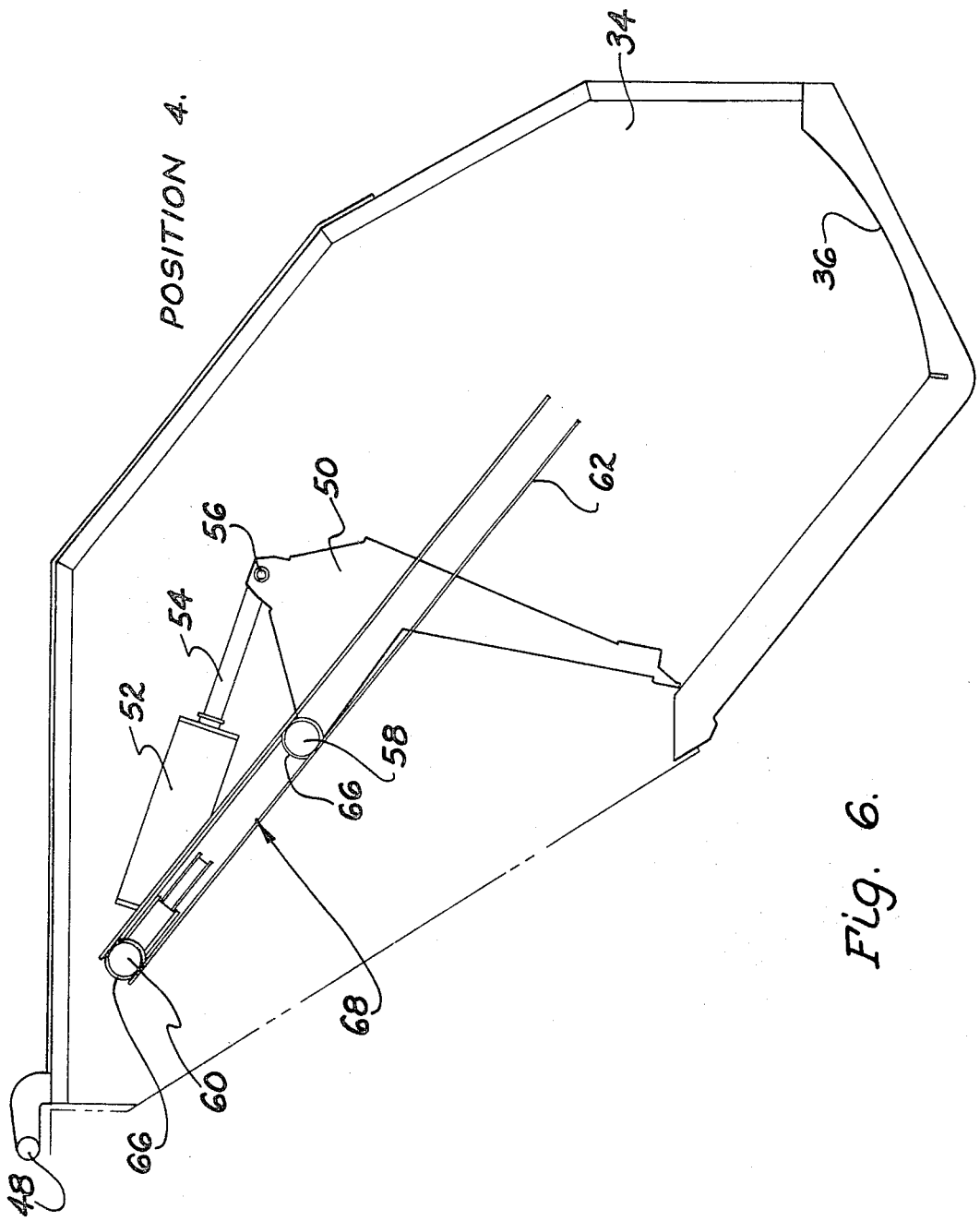

In the circuit position of cycle 3 after blade 50 is moved from the raised Position 2 of FIG. 4 to the refuse engaging Position 3 of FIG. 5 and the ram 54 of blade actuating cylinder 52 is extended to its limit at which time the pressure rises to a predetermined pressure value, then the next pressure responsive controller 73 functions to release spool 3 back to its centered open position, as previously described and cycle 3 is terminated.

It should be mentioned that when spool 3 was in its actuated position its respective poppet 226 communicates with pressurized fluid via axial detector passage 276, radial detector passage 270, housing recess 272, and passage 256, the latter being connected to pressure via passages 254, 228 and 76.

Cycle 4

During this cycle carriage 68 is moved from its lower Position 3 to its upper Position 4 and only the extension side of carriage actuating cylinder 40 is pressurized by the cycle 4 fluid flow circuit shown in FIG. 16.

Since spool 4 is still in its actuated position to the right, the fourth pressurized port 92, FIG. 16, receives pressurized oil via housing passages 282 and 284, and housing grooves 288 and 292, the latter being connected by spool recess 290.

At the same time a right housing port 94 and recess 306 are connected with drain passage 200 in the control means housing via spool recess 304.

As seen in FIG. 16, with the above described connections for cycle 4 the fourth pressurized port 92 delivers pressurized oil to the extension side of carriage actuating cylinder 40 via line 91 and line 93 drains the other side of carriage actuating cylinder 40 via pilot operated check valve 99 and line 97, thence into drain port 94 in the valve housing, through drain passage 200 and line 85 to tank 101.

It should next be mentioned that a poppet element 226 of pressure responsive controller 74 communicates with pressurized fluid via detector passages 298 and 302, housing recess 300, and housing passages 284 282, 254, 228, and 76.

When carriage actuating cylinder 40 reaches the end of its extension stroke, with carriage 66 in Position 4, then a pressure build-up occurs in the system up to some predetermined pressure value at which time the next pressure responsive controller 74 shifts spool 4 in its centered opened position wherein housing passage 282 communicates with drain port 78 thereby returning the flow to the neutral position of FIG. 12.

It will now be seen that the four cycles of automatic pressure responsive actuation have automatically occured from a single setting of the master manual actuator 126.

In so doing it will be understood that the packing blade 50 and carriage 48 have been sequentially cycled from Position 4 through Positions 1, 2, and 3 and then back to Position 4 responsive to the sequentially effective preset pressure signals.

JOG TYPE OPERATION OF THE CONTROL SYSTEM

As previously described herein with connection with FIGS. 10 and 11 spool 2 can be individually actuated by individual manual actuator 122 and similarly spool 3 can be individually actuated by individual manual actuator 123.

In jog operation of carriage 68, manual actuator 122 can either be pressed inwardly towards the body to move spool 2 to the right, FIG. 9, and thereby set up the cycle 2 flow of FIG. 14 required to retaract cylinder 40 and move carriage 68 from Position 1 to Position 2. In addition, individual actuator 122 can be actuated away from the body to shift the spool 2 to the left, FIG. 9, thereby reversing the pressurization of the second housing ports 84 and 86. With spool 2 shifted to the left the cycle 2 flow of FIG. 14 is reversed with line 91 on extension side of cylinder 40 being pressurized via port 86 and line 91 and with the other side of such packing cylinder being drained via line 93 and port 84. In such left spool position for spool 2 the right housing groove 250 is pressurized by spool groove 249 which connects housing recesses 242 and 250 which in turn are pressurized via passage 230, 228 and 76. At the same time housing port 84 is connected to drain passage 200 via housing recess 232 and spool recess 234.

Referring next to jog operation of packing blade 50, the other individual manual actuator 123 can either be pressed inwardly towards the body thereby moving spool 3 to the right which sets up the cycle 3 flow of FIG. 15 wherein only the extension side of blade actuating cylinder 52 is pressurized. When, however, manual actuator 123 is pulled outwardly away from the body the connection to the third housing ports 88 and 90 are reversed with respect to the flow diagram shown in FIG. 15 thereby connecting the retraction side of blade actuating cylinder 52 with pressure whereby the ram 54 is retracted. With spool 3 in the left position, FIG. 9, port 90 is pressurized via housing groove 280 and 272 which are connected by spool groove 278. These are in turn pressurized by passage 256, 254, 228 and 76. At the same time left housing groove 260 is connected to drain passage 200 via spol groove 264.

In such left position of spol 3 it will now be understood that packing blade 50 is raised from the refuse engaging Position 3 to the raised Position 2.

In view of the above, it will now be understood that the operator can easily effect jogging control by either manipulating only individual actuator 122 to move carriage 48 either upwardly or downwardly along its track 62 for either short or long strokes, and by actuating only individual actuator 123 the operator can pivot packing blade 50 between Positions 2 and 3 either with short or long strokes as may be required.

It should further be stated that the primary purpose for the above described jogging capability is to permit the operator to move the packing blade 50 or carriage 48 as may be required to move away from a foreign object that is clogging operation, or to stop the blade or carriage to save an object that the operator does not desire to pack.

In further description of the operation it should be mentioned that the individual pressure responsive controllers 71–74 described above will function sequentially as they are located successively downstream from the pressure source and at any time the high pressure fluid is presented to one of the spools 1–4 while in its actuated position to the right the control system will perform its respective cycle up to the predetermined pressure value for the pressure responsive controller for the particular spool. The system will then proceed to the next succeeding cycle.

As an important advantage of the operation, in the event the mechanism is going through cycle 3 wherein packing blade 50 is being pivoted downwardly from the upper Position 2 towards the lower Position 3, and when the blade engages an object that is too strong to be crushed and packed, such object will arrest downward movement of blade 50, prior to its reaching Position 3, thereby causing a build-up in system pressure which will cause pressure responsive controller 73 to release spool 3 to its centered neutral position. Pressurized oil will next pass on to the next successive spool 4 which is in its cocked position whereby the control system will proceed through cycle 4 and return to neutral.

It should further be mentioned that a foreign object may be engaged when the packing blade has been pivoted from Position 2 to Position 3. The manual actuator can be used to stop the machine, with the packing blade in the obstructed position between Positions 2 and 3. Next the machine can be restarted by actuating manual actuator 126. All four spools will again be cocked. Upon such restarting of the machine cycle 2 will take priority which causes spool 2 to set up the flow required to raise packer blade 50 and thereby reset it against the load. The control system will then proceed to go through cycles 3 and 4 and return to neutral. This is an advantageous feature since such automatic priority of cycle 2 raises the packing blade thereby permitting the obstructing object to reposition before the blade automatically returns to engagement with such object.

Assuming that the machine is going through cycle 1, and the machine is stopped and restarted by operating the master actuator 126 all three spools are reset but spool 1, having already completed its function, will automatically be released back to neutral and the control system will then automatically proceed through cycles 2, 3, and 4 and back to neutral. It will be understood that spool 1 hda completed its function since ram 54 of blade actuating cylinder 52 had been moved completely to its limit prior to the commencement of cycle 2.

In the event that the control system is negotiating cycle 2, and is for any reason stopped and restarted, packing cylinder 40 will complete its retraction, and terminate cycle 2 and the system will then go throuyh cycles 3 and 4 and return to neutral.

In the event the system is negotiating cycle 4, from Position 3 to Position 4, and is stopped and then restarted, spool 2 will take priority. The machine will reset the blade 50, repeat cycle 3, then finish cycle 4 and then return to neutral at which time movement of the blade and carriage are terminated.

We claim:

1. A rear loader type refuse truck comprising, in combination, a body including a forward refuse receiving body portion and a rear packer body portion, said rear body portion including a load receiving opening and a bottom wall; an upwardly and forwardly inclined track means on said rear body portion; a packer blade mounted for longitudinal and pivotal movement on said track means and including a compacting surface for movement along said bottom wall to move refuse into said forward body portion; hydraulic cylinder means for moving said blade on said track means between a forward packing position and a rear refuse engaging position and for moving said blade between an upper refuse engaging position and a lower packing position; means forming a source of pressurized fluid for operating said hydraulic cylinder means; reservoir means for receiving said fluid from said cylinder means; pressure responsive control means for operating said hydraulic cylinder means to move said blade between said refuse engaging and refuse packing positions, said control means being adapted to, upon interruption of said blade, automatically move said blade to a next succeeding position; said control means including a plurality of separate pressure responsive controllers; a plurality of manual actuators each of which operates a respective one of said controllers; and a master manual actuator for simultaneous operation of said plurality of controllers.

2. A rear loaded type refuse truck comprising, in combination, a body including a forward refuse receiving body portion and a rear packer body portion, said rear body portion including a load receiving opening and a bottom wall; an upwardly and forwardly inclined track means on said rear body portion; carriage means movably mounted on said track means; a packer blade pivotally mounted on said carriage means and including a compacting surface for movement along said bottom wall to move refuse into said forward body portion; a carriage actuating hydraulic cylinder connected between said carriage and said body for moving said carriage between a forward packing position and a rear refuse engaging position; a blade actuating hydraulic cylinder operative between said packing blade and said carriage for moving said blade between an upper refuse engaging position and a lower packing position; means forming a source of pressurized fluid for operating said hydraulic cylinders; reservoir means for receiving said fluid from said cylinders, said carriage means and blade being movable to a "Position 1" wherein the carriage is in the forward position and the blade is in the upper position, a "Position 2" wherein the carriage is in the rear position and the blade is in the upper position, a "Position 3" wherein the carriage is in the rear position and the blade is in the lower position, and a "Position 4" wherein the carriage is in the forward position and the blade is in the lower position; control means for said hydraulic cylinders and including a first controller for operation between said Position 4 and Position 1, a second controller for operation between said Position 1 and Position 2, a third controller for operation between said Position 2 and Position 3, and a fourth controller for operation between said Position 3 and Position 4, said control means being adapted to, upon interruption of said blade, automatically move said blade to a next succeeding position; a plurality of manual actuators for said control means each of which operates a respective one of said controllers; and a master manual actuator for simultaneous operation of said plurality of controllers.

3. A rear loader type refuse truck comprising, in combination, a body including a forward refuse receiving body portion and a rear packer body portion, said rear body portion including a load receiving opening and a bottom wall; an upwardly and forwardly inclined track means on said rear body portion; carriage means movably mounted on said track means; a packer blade pivotally mounted on said carriage means and including a compacting surface for movement along said bottom wall to move refuse into said forward body portion; a carriage actuating hydraulic cylinder connected between said carriage and said body for moving said carriage between a forward packing position and a rear refuse engaging position; a blade actuating hydraulic cylinder operative between said packing blade and said carriage for moving said blade between an upper refuse engaging position and a lower packing position; means forming a source of pressurized fluid for operating said hydraulic cylinders; reservoir means for receiving said fluid from said cylinders, said carriage means and blade being movable to a "Position 1" wherein the carriage is in the forward position and the blade is in the upper position, a "Position 2" wherein the carriage is in the rear position and the blade is in the upper position, a "Position 3" wherein the carriage is in the rear position and the blade is in the lower position, and a "Position 4" wherein the carriage is in the forward position and the blade is in the lower position; control means for said hydraulic cylinders and including a first pressure responsive controller for operation between said Position 4 and Position 1, a second pressure responsive controller for operation between said Position 1 and Position 2, a third pressure responsive controller for operation between said Position 2 and Position 3, and a fourth pressure responsive controller for operation between said Position 3 and Position 4, each of said controllers being shiftable by system pressure between a cocked position wherein a flow of pressurized fluid is delivered to certain of said hydraulic cylinders and an open position wherein said flow is terminated, said control means being adapted to, upon interruption of said blade, automatically move said blade to a next succeeding position; and manual actuating means for shifting said controllers between said positions, said manual actuating means including a plurality of manual actuators each of which operates a respective one of said controllers; and a master manual actuator for simultaneous operation of said plurality of controllers.

4. A rear loader type refuse truck comprising, in combination, a body including a forward refuse receiving body portion and a rear packer body portion, said rear body portion including a load receiving opening and a bottom wall; an upwardly and forwardly inclined track means on said rear body portion; a packer blade mounted for longitudinal and pivotal movement on said track means and including a compacting surface for movement along said bottom wall to move refuse into said forward body portion; hydraulic cylinder means for moving said blade on said track means between a forward packing position and a rear refuse engaging position and for moving said blade between an upper refuse engaging position and a lower packing position; means forming a source of pressurized fluid for operating said hydraulic cylinder means; reservoir means for receiving said fluid from said cylinder means; a plurality of separate pressure responsive control means for operating said hydraulic cylinder means to move said blade between said refuse engaging and refuse packing positions, said control means being adapted to, upon interruption of said blade, automatically move said blade to a next succeeding position; and a plurality of manual actautors each of which operates a respective one of said controllers.

5. A rear loader type refuse truck comprising, in combination, a body including a forward refuse receiving body portion and a rear packer body portion, said rear body portion including a load receiving opening and a bottom wall; an upwardly and forwardly inclined track means on said rear body portion; a packer blade mounted for longitudinal and pivotal movement on said track means and including a compacting surface for movement along said bottom wall to move refuse into said forward body portion; hydraulic cylinder means for moving said blade on said track means between a forward packing position and a rear refuse engaging position and for moving said blade between an upper refuse engaging position and a lower packing position; means forming a source of pressurized fluid for operating said hydraulic cylinder means; reservoir means for receiving said fluid from said cylinder means; pressure responsive control means for operating said hydraulic cylinder means to move said blade between said refuse engaging and refuse packing positions, said control means being adapted to, upon interruption of said blade, automatically move said blade to a next succeeding position, said pressure responsive control means including a plurality of sequentially operated pressure responsive controller valves; and manually actuated control means for selectively resetting certain of said pressure responsive controller valves.

References Cited

UNITED STATES PATENTS

| | | | |
|---|---|---|---|
| 3,092,269 | 6/1963 | Brown et al. | 214—83.3 |
| 3,143,230 | 8/1964 | Gollnick | 214—83.3 X |
| 3,297,180 | 1/1967 | Park et al. | 214—83.3 |
| 3,348,708 | 10/1967 | Gollnick | 124—83.3 |

ALBERT J. MAKAY, Primary Examiner